(12) United States Patent
Joshi et al.

(10) Patent No.: US 6,252,537 B1
(45) Date of Patent: Jun. 26, 2001

(54) AIR-TO-AIR GUIDANCE SYSTEM AND METHOD OF OPERATING SAME

(75) Inventors: Gajanan H. Joshi, Lexington; Roland A. Cherwek, Lynnfield; Paul C. Hamilton, Acton; David N. Martin, Sudbury, all of MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 06/116,501

(22) Filed: Jan. 21, 1980

(51) Int. Cl.[7] ................. G01S 7/36; G01S 7/38
(52) U.S. Cl. ............. 342/13; 342/14; 342/15; 342/16; 342/17; 342/62
(58) Field of Search .............. 343/18 E; 342/13, 342/14, 15, 16, 17, 12, 62, 63

(56) References Cited

U.S. PATENT DOCUMENTS

| | | | |
|---|---|---|---|
| 3,212,091 | * 10/1965 | Bissett et al. | 343/18 E X |
| 4,384,292 | * 5/1983 | Prime, Jr. | 342/16 |
| 4,538,152 | * 8/1985 | Wirth | 342/158 |
| 4,646,098 | * 2/1987 | Mattern et al. | 342/14 |
| 4,763,128 | * 8/1988 | Caswell | 342/14 |
| 4,823,139 | * 4/1989 | Eisner et al. | 342/15 |
| 5,153,594 | * 10/1992 | Moffat | 342/15 |
| 5,291,199 | * 3/1994 | Overman et al. | 342/13 |
| 5,317,314 | * 5/1994 | Mead | 342/16 |
| 6,049,301 | * 4/2000 | Weagant | 342/13 |

* cited by examiner

*Primary Examiner*—John B. Sotomayor
(74) *Attorney, Agent, or Firm*—Daly, Crowley & Mofford, LL

(57) ABSTRACT

(U) A system for protecting a strategic bomber approaching the field covered by an airborne surveillance radar is shown to include: A search receiver arrangement to detect interrogating pulses from such radar before detection by such radar is possible and to determine the range of such radar and an air-to-air guided missile adapted first to home on the source of the interrogating pulses and then to be guided to intercept by an active radar seeker.

1 Claim, 4 Drawing Sheets

AIR-TO-AIR GUIDANCE SYSTEM AND METHOD OF OPERATING SAME

Figure 1A:
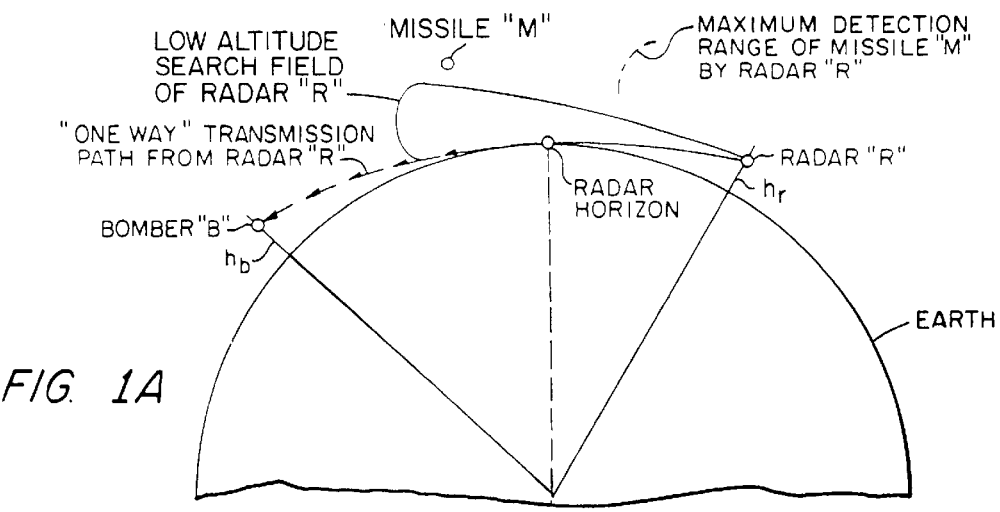

BACKGROUND OF THE INVENTION (U) This invention pertains generally to guidance systems for air-to-air guided missiles and particularly to systems of the type required for air-to-air guided missile carried by strategic bombers.

(U) It must be postulated that any strategic bomber on an actual mission during wartime would have to penetrate airspace under surveillance of an early warning radar on an aircraft which serves as the control center of an "airborne warning and control system," commonly called "AWACS". Once the location of the strategic bomber has been determined, interceptors may be vectored to attack and destroy such bomber long before its desired mission may be accomplished.

(U) It is manifest that neutralization of the early warning radar of the defensive AWACS before a strategic bomber is detected or located by such a radar offers the first and best chance for such bomber successfully to pursue its mission without having to engage in combat with interceptors attached to the AWACS. That is to say, any strategic bomber should be equipped first to detect, before it is itself detected, interrogating signals from a surveillance radar of a defensive AWACS and then to interdict such radar (either by destroying the aircraft carrying such radar or by forcing shutdown before the strategic bomber itself is located).

(U) It is apparent that successful interdiction of an airborne surveillance radar requires that each strategic bomber be equipped with: (a) a "quiet" detector (meaning a search receiver and appropriate signal processors) to allow the location of such radar to be determined even in the presence of many interfering signals; and (b) a long range air-to-air guided missile which may be launched from the strategic bomber and then guided toward the airborne surveillance radar, from a point outside the maximum detection range of such radar, to an intercept, all without transmission of any kind of signal from the strategic bomber. Satisfaction of the latter requirement is, considering the state of the art, difficult to achieve because of limitations on the size and weight of any long range air-to-air missile carried by any known strategic bomber. As a matter of fact, in the tactical situation here being considered, such limitations are determinative of the distance a long range air-to-air guided missile may fly; as a result, then, the requisite guidance system for such a missile must be as small and efficient as possible and must, further, accomplish its purpose with a minimum amount of maneuvering of the missile.

SUMMARY OF THE INVENTION (U) In view of the foregoing background of this invention, it is a general object of this invention to provide an improved system for interdicting an AWACS.

A specific object of this invention is to provide, in the contemplated system, a way of determining the range of an airborne surveillance radar from a strategic bomber, such determination being made without requiring any electromagnetic radiation from such bomber.

(U) Another specific object of this invention is to provide an improved radar receiver adapted to derive, in the presence of many interfering signals, guidance signals for an air-to-air guided missile to cause such missile to home on the source of selected radar signals.

(U) Another specific object of this invention is to provide ranging signals by processing information from the contemplated improved radar receiver.

(U) Another specific object of this invention is to provide an improved way of initiating the terminal phase of flight of an air-to-air guided missile so that a selected target may be more easily and surely detected and tracked in the presence of clutter.

(U) The foregoing and other objects of this invention are generally attained by providing at least one long range air-to-air guided missile on a strategic bomber for interdicting an early warning surveillance radar in an AWACS system without requiring any type of electromagnetic radiation from either such bomber or missile until the terminal stage of flight of the latter is initiated. To accomplish the desired result, a conventional search receiver and signal processor is installed on the strategic bomber to detect interrogating signals from the early warning radar and to determine the position of such radar relative to such bomber. An air-to-air guided missile, adapted first to detect and to home on the early warning rather and then to be guided by an active radar guidance system to the aircraft carrying the early warning radar, is also provided to complete the contemplated system.

Figure 1B:
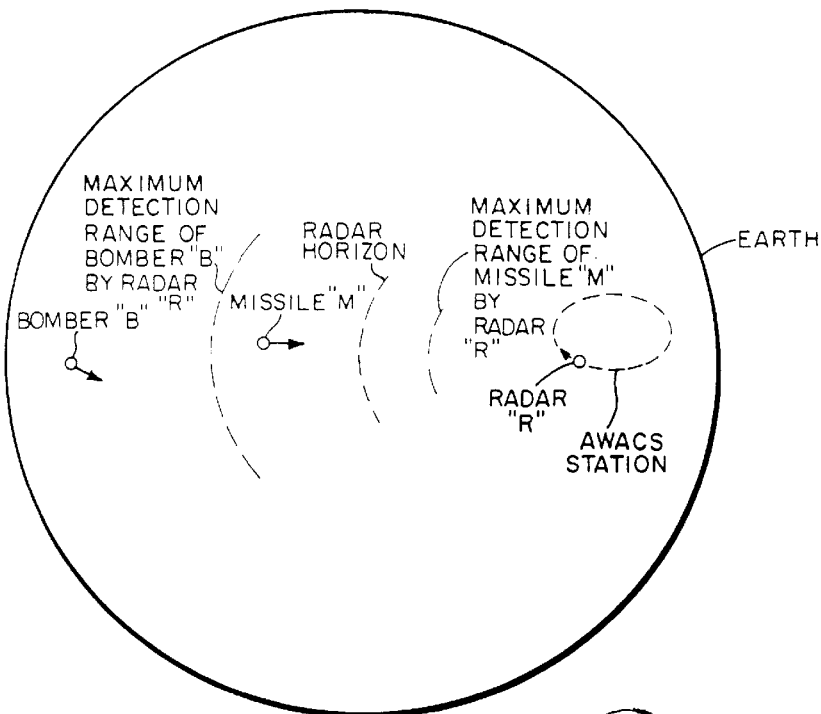
Figure 1C:
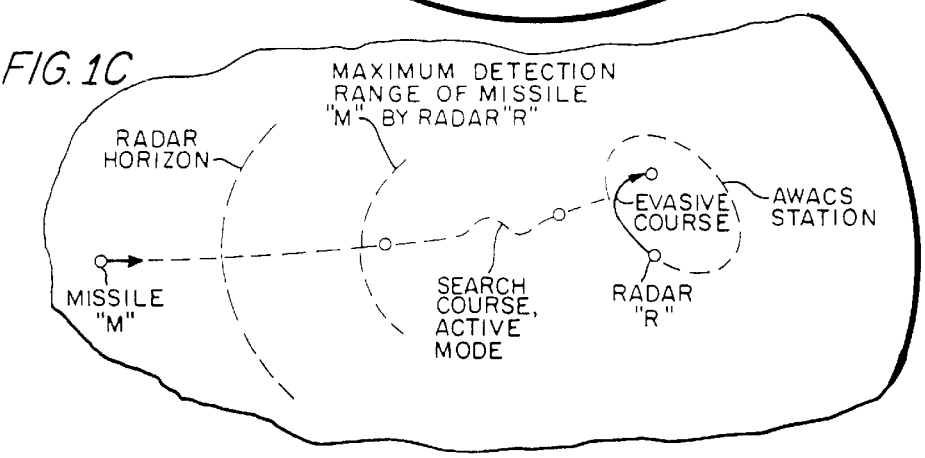
Figure 2:
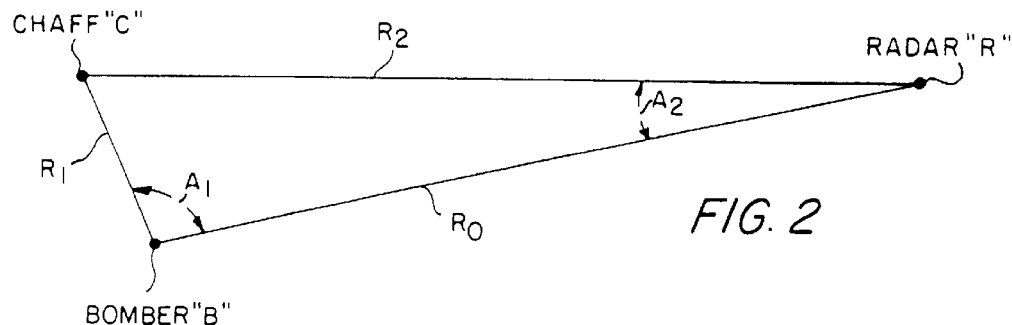
Figure 6:
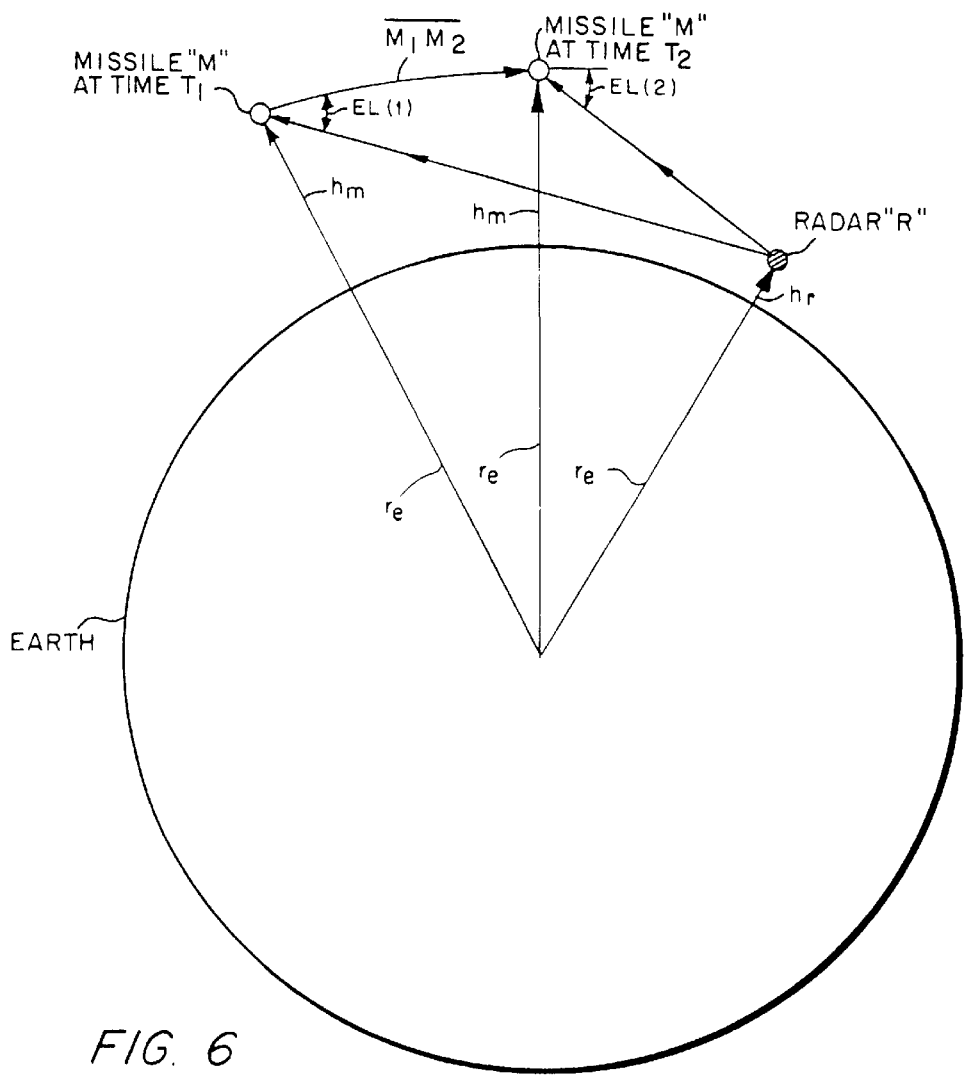
Figure 3:
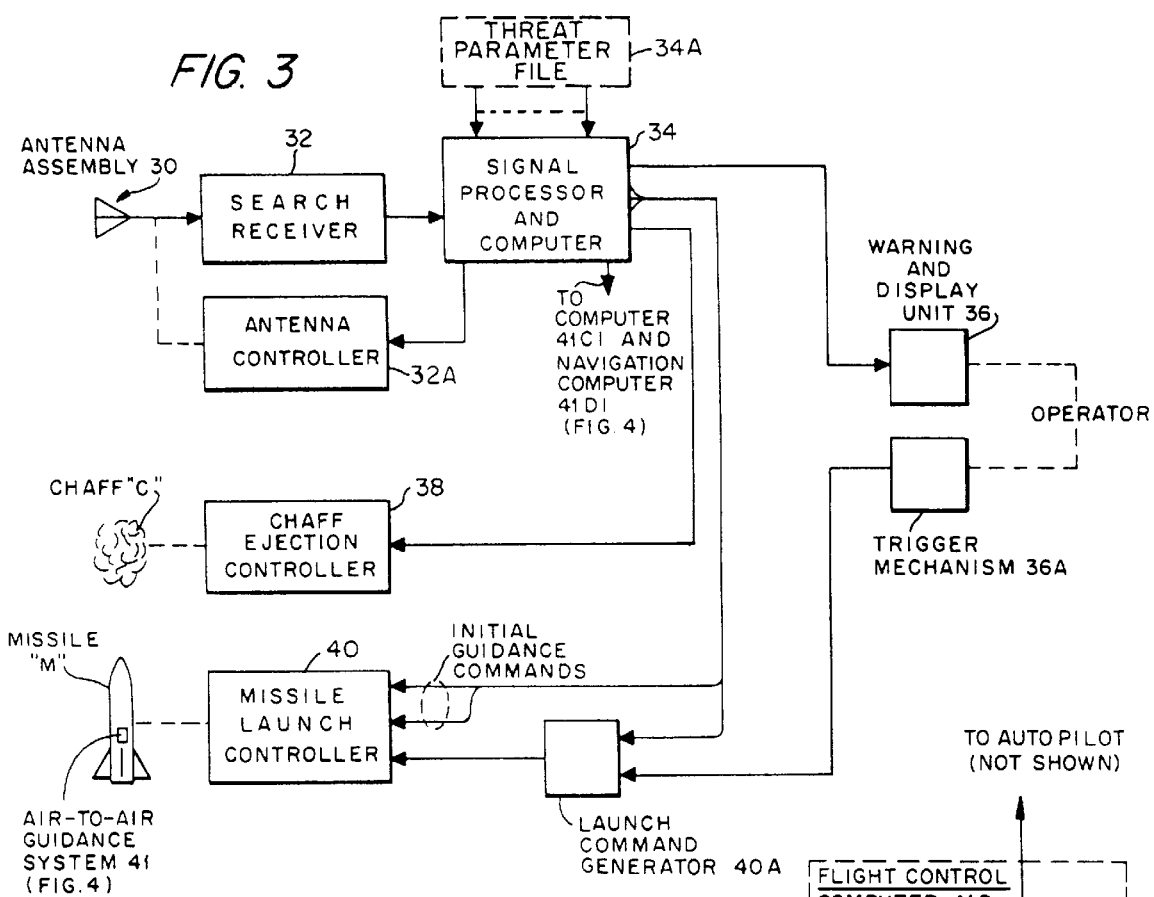
Figure 4:
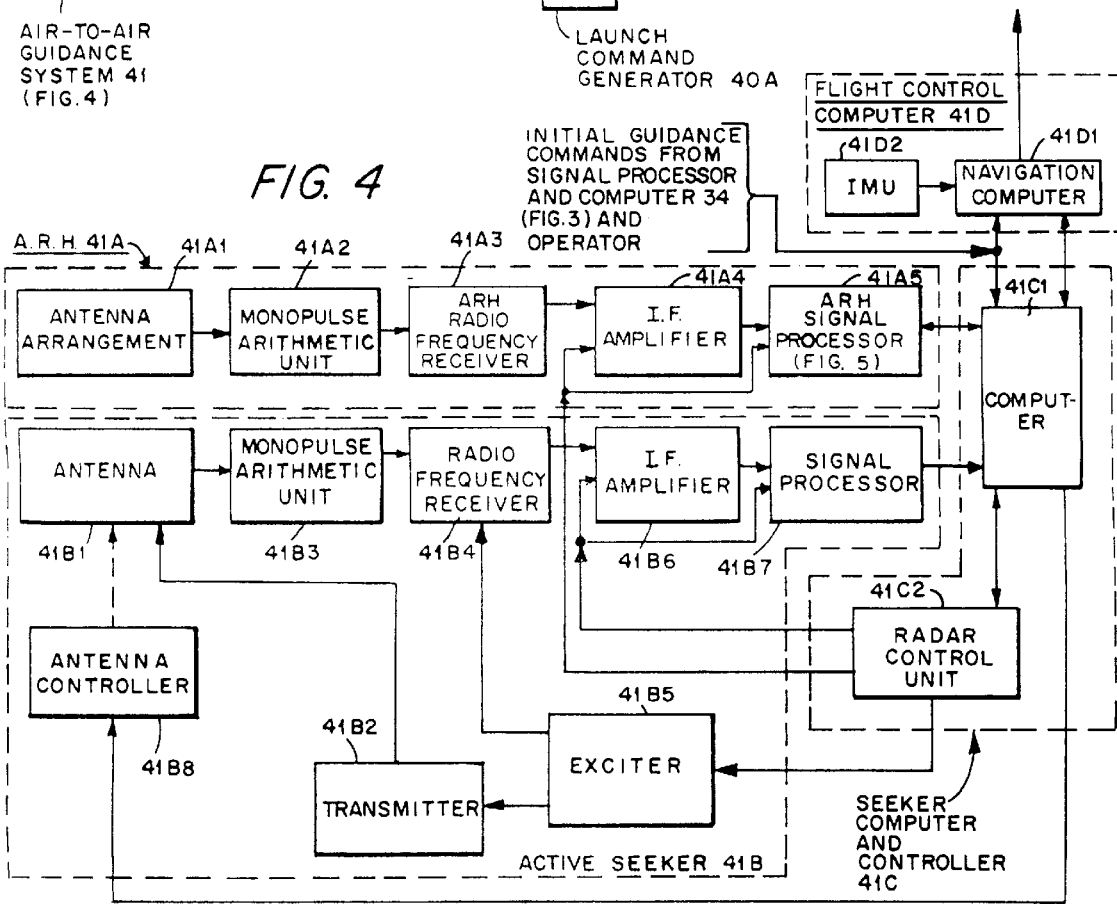
Figure 5:
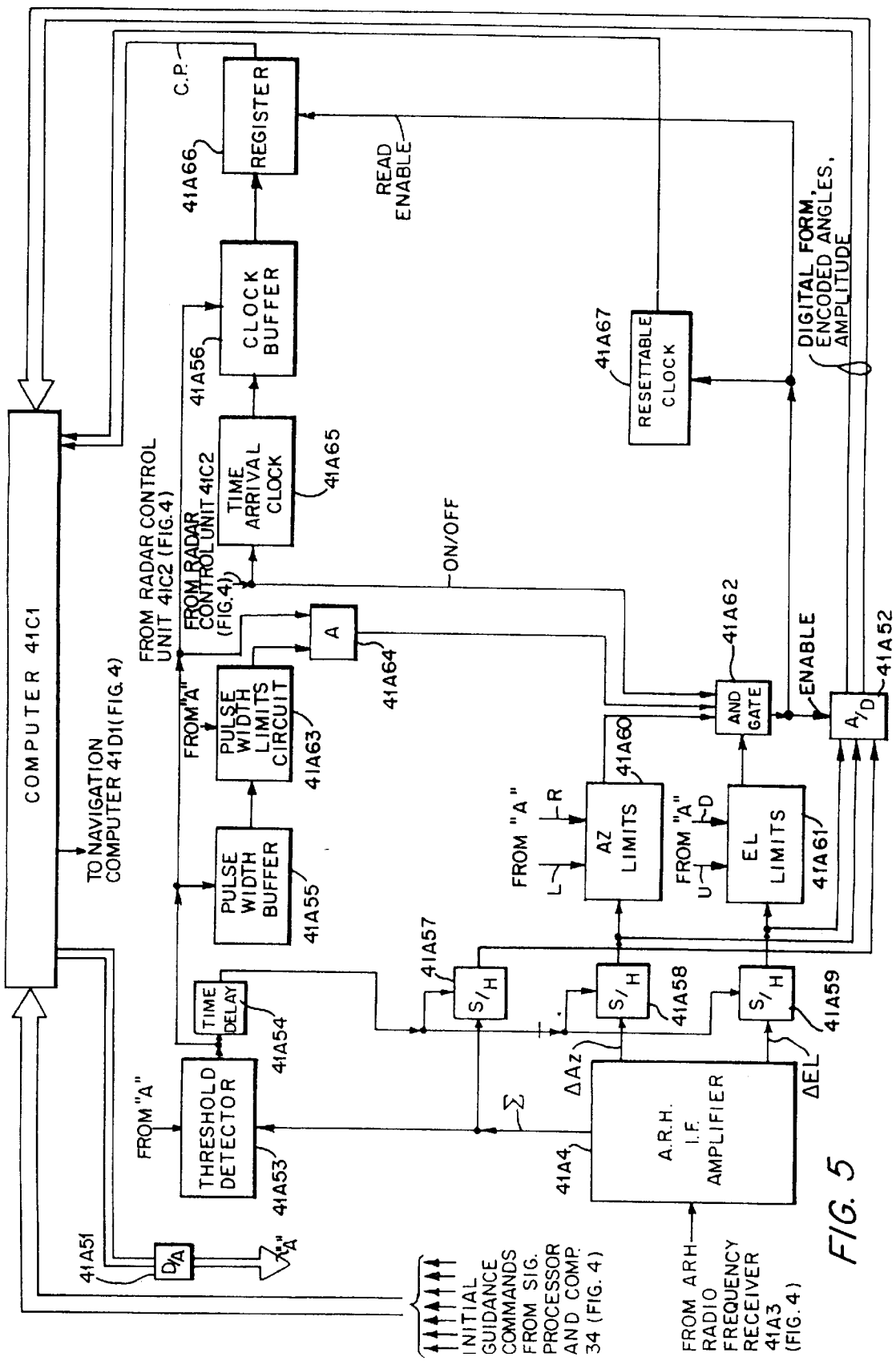

BRIEF DESCRIPTION OF THE DRAWINGS (U) For a more a complete understanding of this invention, reference is now made to the following description of the attached drawings wherein:

(U) FIGS. 1A, 1B and 1C are simplified sketches illustrating an exemplary tactical situation, which FIGURES illustrate the magnitude of the technical problems to be solved;

(U) FIG. 2 is a sketch showing how passive ranging is contemplated to be accomplished on a strategic bomber;

(U) FIG. 3 is a generalized block diagram of equipment carried on a strategic bomber to allow ranging to be accomplished and the initial conditions of flight of an air-to-air missile to be set;

(U) FIG. 4 is a generalized block diagram of the contemplated guidance system for an air-to-air missile;

(U) FIG. 5 is a sketch showing how a receiver on an air-to-air missile is contemplated to be implemented to reduce the effects of interfering signals; and (U) FIG. 6 is a sketch showing how passive ranging is contemplated to be effected on an air-to-air missile.

DESCRIPTION OF THE PREFERRED EMBODIMENTS (C) Referring first to FIGS. 1A and 1B, it may be seen that an engagement is begun before a bomber "B" flying at a height, $h_b$, above the earth (not numbered) penetrates the search field covered by an airborne surveillance radar (referred to hereinafter as the radar "R"). The latter is mounted on an aircraft (not shown) serving as the control center of an AWACS. Because of the curvature of the earth and effects of the atmosphere on propagation, the shape of the search field (which corresponds to the main lobe of the antenna pattern of the radar "R") normally is distorted to some degree so that with proper choice of radar design parameters, some coverage is attained for low altitude targets beyond the radar horizon. However, the maximum detection range at which the bomber "B" may be detected by the radar "R" ordinarily may be deemed to be less than the range at which radar signals from the radar "R" may be detected on board the bomber "B".

(S) It will be recognized that the maximum detection range of a bomber by a long range surveillance radar and the range at which interrogating signals from such a radar may be detected on the bomber "B" are dependent upon many factors, some of which may not be known, a priori. That is to say, the particular atmospheric conditions which exist at any time determine how the length of such ranges will vary from a norm. Thus, with a long range surveillance radar having given parameters at a first given altitude and an airborne target of a given size at a second given altitude the ranges at which each may be detected by the other will vary with changes in atmospheric conditions and the character of the terrain adjacent to the radar horizon. It will also be evident that the distances of the radar "R" and the bomber "B" from the radar horizon will vary with their altitudes and that a shadow, or penumbra, will exist on the side of radar horizon distal from the radar "R". It follows then that the altitude of the bomber "B" may be decreased whenever interrogating pulses from the radar "R" are detected so that the maximum detection range of such bomber is reduced under normal atmospheric conditions to, say 550 nautical miles for a modern bomber in the search field covered by the main beam of a modern airborne surveillance radar. It will be noted in passing that, as indicated in FIG. 1A, the maximum detection range for an air-to-air missile (whose radar cross-section is much less than that of a strategic bomber) is correspondingly less than the maximum detection range of such a bomber. As a matter of fact, if an air-to-air missile (missile "M") is, as is here contemplated, at a high altitude (say 16 nautical miles) until the terminal phase of flight, such a missile will remain out of the search field of any known airborne surveillance radar. Therefore, unless scanning of the airborne surveillance radar is periodically modified or the shape of the main beam is periodically altered (as indicated in FIG. 1A) to permit detection of a small target at a high altitude, there is little probability of detection of the missile "M" before it enters the terminal phase of its flight. It must be assumed, however, that such an undetected attack cannot be tolerated, so the AWACS would be arranged to detect small targets at high altitude at a "safe" range, say 50 to 75 nautical miles. Detection at such a range would give the AWACS sufficient time to shut down the surveillance radar and to take evasive maneuvers. It would be necessary, then, for the missile "M" to be guided by an active radar system.

(U) Referring now to FIG. 2, it may be seen that if a cloud of chaff "C" is ejected in any convenient manner from the bomber "B", each interrogating pulse from the radar "R" to the bomber "B" will pass over a direct path "$R_0$" and over an indirect path "$R_2$"+"$R_1$". The difference "$\Delta R$" between the lengths of the direct path and of the indirect path is directly proportional to the difference in the times of arrival at the bomber "B" of each interrogating pulse over the direct and indirect paths; the range $R_1$ is proportional to the elapsed time after ejection and the velocity of the bomber "B"; and the angle "$A_1$" is equal to the difference between the angles of arrival of each interrogating pulse on its direct and indirect paths. If, then, the law of cosines is applied and appropriate substitution is made for $R_2$ (e.g. $R_2=R_0+\Delta R-R_1$) then it may be shown $$R_0=\Delta R(R_1-\Delta R/2)(R_1(\cos A_1-1)+\Delta R) \qquad \text{Eq. (1)}$$

(U) Alternatively, if the scan rate, azimuthal beamwidth and pulse repetition frequency of the radar "R" are measured, the difference in the times at which the beam from the radar "R" is centered on the bomber "B" and on the chaff "C" may be measured to allow the angle "A" to be determined. Then, application of the law of sines (again substituting for $R_2$) results in:

$$R_0=\Delta R/[(\sin A_1+\sin A_2)/\sin (A_1+A_2))-1] \qquad \text{Eq. (2)}$$

(U) In either case, it will be observed that the range $R_0$ is calculable without requiring any emission of electromagnetic energy from the bomber "B".

(U) Referring now to FIG. 3, the equipment on the bomber "B" is shown to include an antenna assembly 30 (preferably including monopulse antennas to allow the angles of arrival of the individual interrogating pulses to be measured with precisions). All signals received by the antenna assembly 30 are fed to a search receiver 32 of conventional construction to produce video signals for a signal processor and computer 34. That processor and computer is adapted to compare preselected parameters of the received signals (such as frequency, pulse width and repetition frequency to name only a few) with corresponding parameters which are descriptive of signals from an AWACS and are stored in a stored parameter file 34A to: (a) identify interrogating pulses from the radar "R" (FIGS. 1A, 1B); (b) determine the position of such radar relative to the bomber "B" (FIGS. 1A, 1B); and (c) produce at least the various control and condition signals shown. That is, a warning and display unit 36 is actuated to alert the crew that interrogating pulses from a surveillance radar of an AWACS are being received and the requisite control signals are supplied to an antenna controller 32A, is chaff ejection controller 38 and a missile launch controller 40. After the direct and indirect signals discussed in connection with FIG. 2 are processed and the relative position of the radar "R" is calculated and the proper initial guidance commands are impressed on an air-to-air guidance system 41, the missile "M" may, at the option of an operator, be launched in the manner indicated by actuation of a trigger mechanism 36A and a launch command generator 40A.

(U) Referring now to FIG. 4, a general block diagram of the contemplated air-to-air guidance system in the missile "M" is shown to include an antiradiation homing seeker (ARH 41A), an active seeker 41B, a seeker computer and controller 41C and a flight control computer 41D. ARH 41A is used in the initial and midcourse stages of flight of the missile "M" (FIGS. 1A, 1B) when the radar "R" (FIGS. 1A, 1B) is operating in its normal surveillance mode. The active seeker 41B is used in the terminal stage of flight of the missile "M" (FIGS. 1A, 1B) after the missile has been detected, the radar "R" then being shut down to render the ARH 41A ineffective.

(U) The ARH 41A includes an antenna arrangement 41A1, here a monopulse antenna (or antennas) covering the frequency band (or bands) of interest and a monopulse arithmetic unit 41A2 to produce sum and difference signals from each received signal in the band (or bands) of interest. Such sum and difference signals are applied to an ARH radio frequency receiver 41A3.

(S) It will be appreciated that the data rate, meaning the number of signals per unit time, entering the ARH radio frequency receiver 41A3 may be in excess of 200,000 pulses per second. Such a rate ordinarily would make it necessary to provide high speed signal processing and computing means if all of the received signals are to be processed in real time. It follows that, with an a priori knowledge of a number of distinguishing parameters of the interrogating pulses from the radar "R" (FIGS. 1A, 1B), such pulses may be distinguished in a conventional manner by comparing each received pulse, or set of pulses, with determinants stored in the seeker computer and controller 41C to separate interrogating pulses of interest from all other received pulses. As noted hereinbefore, such an approach places a large burden on the required analog-to-digital converters and on the seeker computer and controller 41C. To reduce the burden drastically, it is here contemplated that, to the extent possible, the antiradiation receiver (ARH 41A) be controlled by signals from the seeker computer and controller 41C to inhibit passage through such receiver of any received signals which cannot possibly be signals from a surveillance radar of an AWACS. As a result, then, the data rate of the signals which actually have to be processed to determine whether or not interrogating pulses from a surveillance radar of an AWACS are present is drastically reduced, say to about 400 pulses per second. A preferred way to effect the desired filtering is described hereinafter; suffice it to say here that it is contemplated here to represent four parameters (angles-of-arrival in azimuth and elevation, amplitude, pulse width, and, if needed, frequency of each received pulse by corresponding voltage levels and, unless all of such levels are within limits set in an ARH signal processor 41A5 by the seeker computer and controller 41C, to inhibit passage of unwanted pulses from an ARH signal processor 41A5 to the seeker computer and controller 41C. The ARH If amplifier 41A4 is actuated by a control signal from a radar control unit 41C2 at all times during flight of the missile "M" (FIG. 3) until the terminal phase of flight when the active seeker 41B is in operation. As a result, then, the load on the seeker computer and controller 41C and ancillary components is drastically reduced.

(U) The ARH I.F. amplifier 41A4 here incorporates double-down conversion in each monopulse channel and quadrature detection to derive pitch and yaw signals which define the direction of the source of each one of the received signals; the ARH signal processor 41A5 inhibits, in a manner made clear in FIG. 5 conversion of all pitch and yaw signals (except those which could possibly be from the surveillance radar of an AWACS) to digital signals for further processing in a computer 41C1.

(S) Because the input signals to the seeker computer and controller 41C have been restricted to those signals which could possibly come from a surveillance radar of an AWACS, the computer 41C1 need not be a high speed computer; as a matter of fact, the computer need only have the processing speed and characteristics of, say, a NOVA 3/12. In addition of the inputs from the ARH signal processor 41A5, position and attitude signals from a conventional navigation computer 41D1 are fed into the computer 41C1. The computer 41C1 and the navigation computer 41D1 are provided with initial target position information from the signal processor and computer 34 (FIG. 3) to set initial conditions and to designate the target before launch of the missile "M" (FIG. 3). After launch, the outputs of the navigation computer 41D1 are controlled in accordance with the outputs of conventional inertial measurement units (IMU 41D2) and boresight error signals from the computer 41C1. It will be apparent to one of skill in the art that a conventional autopilot (not shown) may be actuated by signals from the navigation computer 41D1 to cause the missile "M" (FIGS. 3, 1A, 1B, 1C) to follow a desired guidance mode during its flight toward a target. Specifically, it is here contemplated that the missile "M" follow the following flight profile: (a) on launching, fly to a relatively high altitude (say 16 nautical miles) and then pitch over to a course corresponding to the bearing of the surveillance radar to be interdicted; (b) then in a mid-course phase, fly on a pursuit course toward the surveillance radar, maintaining altitude and changing course only to maintain a relative bearing (in azimuth) of zero; (c) continuing on a pursuit guidance course, initiate and track with active radar guidance system; and (d) finally fly toward the surveillance radar on a proportional navigation course determined by signals from an active radar guidance system. In connection with the transition from the midcourse phase to the terminal phase it is necessary to ensure acquisition of the desired target by the active radar; it is contemplated here that the requisite search operation be carried out by maneuvering the missile "M" (FIG. 1C) in a way which maximizes the "signal-to-clutter" ratio.

(U) Referring now to FIG. 5, it may be seen that the computer 41C1 provides, through a bank of digital-to-analog converters (here shown as a single converter, D/A 41A51), a number of reference signal levels which determine which ones of the signals out of the ARH I.F. amplifier 41A4 may be passed through a bank of analog-to-digital converters (here shown as a single converter, A/D 41A52). Although other parameters may be used in place of, or in addition to, the parameters which serve to control operation of the ARH signal processor 41A5, the following have been here chosen: (1) minimum amplitude of the received signal; (2) pulse width of the received signal; (3) azimuth angle (measured from the centerline of the missile "M" (FIG. 4)) of the angle of arrival of the received signal; (4) elevation angle (measured from the centerline of the missile "M" (FIG. 4)) of the received signal; and (5) an "ARH mode enable" signal from the radar control unit 41C2. It will be observed that the limits of the chosen parameters (except for the last) here may easily be formed as digital signals in the computer 41C1 in the course of flight of the missile "M" (FIGS. 1A, 1B) and that such digital signals may be converted to analog signal levels in conventional digital-to-analog converters 41A51.

(U) The "minimum amplitude" signal is applied as the reference signal to a threshold detector 41A53 to which the sum signal out of the ARH I.F. amplifier 41A4 is also applied. That detector then produces an enabling signal whenever the amplitude of the sum signal exceeds the threshold. The enabling signal is applied to a time delay circuit (M.V. 41A54), a pulse width buffer 41A55 and a clock buffer 41A56. The output of M.V. 41A54 (which is a one-shot multivibrator) sets the time duration of the "hold" of a set of three sample-and-hold circuits (S/H 41A57, S/H 41A58, S/H 41A59) which sample the sum, azimuth difference and elevation difference channels of the ARH I.F. amplifier 41A4. The two difference signals are fed to comparators (here designated AZ LIMITS 41A60 and EL LIMITS 41A61) to which signals (L, R, U, D) from D/A 41A51 are also applied, such signals being representative of the limits in azimuth and elevation of signals to be processed further. If, then, both difference signals lie within the limits, two of the four input terminals of an AND gate matrix 41A62 are enabled.

(U) The output of the pulse width buffer 41A55 is applied to a comparator (pulse width limits circuit 41A63) to which signals representative of the width of pulses from a surveillance radar of an AWACS are also applied. Whenever the signal out of the pulse width limits circuit is indicative of a pulse with a proper length and the amplitude of the pulse is above the threshold, an AND gate 41A64 is enabled to enable the third input of the AND gate matrix 41A62.

(U) The fourth input of the AND gate matrix 41A62 is enabled by an ARH mode signal from the radar control unit 41C2 (FIG. 4). With all of the inputs to the AND gate matrix 41A62 enabled (indicating that a pulse being processed is one which could be an interrogating pulse from a surveillance radar of an AWACS) an enabling signal is passed to three analog-to-digital converters (here shown as A/D 41A52) to enable those units to convert the then existing analog signals out of S/H 41A57, S/H 41A58, S/H 41A59 to digital form for further processing in the computer 41C1.

(U) It is necessary also to transmit the time of arrival of each processed pulse. To accomplish this end, a time of arrival clock 41A65 is actuated by the ARH mode signal from the radar control unit 41C2 and the count of the clock is gated through the clock buffer 41A56 (when a pulse of proper amplitude is received) to a register 41A66. The read enable input of the latter is actuated whenever the A/D 41A52 is enabled.

(U) It is also necessary to provide the computer 41C1 with an input from which the pulse repetition interval between successive pulses which meet all of the determinants applied to the ARH signal processor being described. Such an end is attained here simply by triggering a resettable clock (M.V. 41A67) whenever the output of the AND gate matrix 41A62 indicates the presence of each "valid" pulse. ("Valid" here is meant to define a pulse which could have originated at the radar "R" (FIGS. 1A, 1B)). It will now be apparent to one of skill in the art that, with an a priori knowledge of the pulse repetition interval between interrogating pulses from the radar "R" and of the scan rate of such radar the computer 41C1 may be programmed first to distinguish interrogating pulses from the radar "R" from other "valid" pulses and then to process those pulses which have been found to have originated at the radar "R". It will also be apparent that the determinants produced in the computer 41C1 and applied to D/A 41A51 may be changed as the time of flight (or any other relatively slowly varying parameter) changes to take changing conditions into account. For example, it will be apparent that the determinants here selected to define "valid" pulses will change in one way during the initial phase of flight of the missile "M" (FIGS. 1A, 1B) and in another after the homing mode has been initiated. Finally, it will be apparent that the computer 41C1 may be programmed to produce, during the midcourse phase of flight, azimuth error signals which may be accepted by the navigational computer 41D (FIG. 4) and converted to command signals for the autopilot (not shown) to cause such error signals to be nulled.

(S) Referring now to FIG. 6, it will be noted that the following assumptions have been made: (1) in the time interval between times $T_1$ and $T_2$, the position of the radar "R" does not change substantially; (2) the triangle defined by the lines of sight between the missile "M" and the radar "R" at times $T_1$ and $T_2$ is, essentially, a vertical triangle (meaning that the three radii of the earth marked "r" are, essentially, coplanar); and (3) the arc of the great circle defined by movement of the missile "M" between times $T_1$ and $T_2$ is substantially the same as the corresponding chord. It will also be noted that, with the missile "M" at a height, $h_m$, of say 16 nautical miles and the radar "R" at a maximum height, $h_r$, say of 5 nautical miles, the effect of refraction on the radar beam from the radar "M" is insignificant, especially when the missile "M" approaches the end of the midcourse phase, at a range, say, of 50 nautical miles from the radar "R". With the foregoing assumptions in mind, it will be obvious from FIG. 6 that, at time $T_2$, the distance between the missile "M" and the radar "R" may be calculated by applying the low of sines to the triangle defined by the lines of sight between the radar "R" and the missile "M" at times $T_1$ and $T_2$. That is to say, with the distance, $\overline{M_1M_2}$, i.e. the distance traveled by the missile "M" in the interval between $T_1$ and $T_2$, known (by use of IMU 41D2, FIG. 4) and the angles EL(1) and EL(2) measured, it is evident that:

$$R(T_2)=\overline{M_1M_2} \sin EL(1)/\sin[EL(2)-EL(1)] \qquad \text{Eq. (3)}$$

where $R(T_2)$ is equal to the range of the radar "R" from the missile "M" at time $T_2$.

(U) It should be appreciated that while for purposes of illustration in FIG. 6, measurements are indicated only at time $T_1$ and $T_2$, in actual practice as the missile "M" traverses path $\overline{M_1M_2}$ from time $T_1$ to time $T_2$ a number of measurements are made, and, on the basis of predictive filtering, successive estimates of the position of the radar R are provided.

(C) It may be deduced from Eq. (3) that, with any given interval of time between measurements of the angles, the precision with which range may be determined is related to the difference between the angles (EL(1) and EL(2)). Fortunately, as the missile "M" closes on the radar "R", the difference between such angles increases so that, as the end of the midcourse phase is approached, range may then be determined with an accuracy of ±10% (approximately). It follows, then, that the altitude of the aircraft carrying the radar "R" may also be calculated. Thus, $$h_r \dot{=} h_m - R(T_2) \sin EL(2) \qquad \text{Eq. (4)}$$

The error in calculation of $h_r$ is essentially dependent upon the error in calculation of $R(T_2)$ because $h_m$ is determined by the IMU 41D2 (FIG. 4) and the angle EL(2) is measured to within, say, 0.2°.

(U) It will be appreciated that the maximum detection range of the missile "M" by the radar "R" may very well exceed the maximum detection range at which the aircraft (not shown) carrying the radar "R" may be detected by the active seeker 41B (FIG. 4) in the missile "M". It follows, then, that (as shown in FIG. 1C), that aircraft could follow an evasive course (with the radar "R" shut down) for a sufficiently long period of time to require an acquisition mode be exercised by the active seeker 41B (FIG. 4) before tracking may begin. It will also be appreciated that the requisite acquisition mode must be carried out in a most efficient manner for the following reasons: (1) the fuel carried by the missile "M" to be used for maneuvering must (remembering that a significant portion of such fuel would already have been expended during the earlier phases of flight) be husbanded to save enough fuel for maneuvering during the terminal phase of flight; (2) the relative positions of the missile "M" and the aircraft carrying the radar "R" will always be such that the active seeker 41B (FIG. 4) will always be "looking down" (meaning that clutter signals will always compete with the echo signals from such aircraft; and (3) the "time-to-go" (meaning the flight time remaining before intercept of the aircraft carrying the radar "R" by the missile "M") is very short so tracking by the active seeker 41B (FIG. 40 must be initiated as soon as possible to avoid an undesirably large "miss distance" at intercept.

(C) Referring again to FIG. 1C and also to FIG. 4, it may be seen that, during the acquisition mode when a search for echo signals from the target aircraft is being effected, the missile "M" is commanded to yaw, with the antenna 41B1 (FIG. 4) slewed to point along the course line of the missile "M", so that the course of the missile "M" follows an "S-shape" and the main lobe of the antenna 41C1 traces swaths (not shown) ahead of the missile "M". The movement of the missile "M" causes successive swaths to be displayed one from another along the velocity vector of the missile "M" and the change in course causes the individual swaths to extend on either side of the initial velocity vector (i.e. the velocity vector when the acquisition mode is started). Obviously, then, with a main lobe of sufficient width, a field of view is covered ahead of the missile "M" with all possible positions of the aircraft carrying the radar "R" being within such field. It will be noted that the depression angle, i.e., the elevation difference angle (such as EL(1) and EL(2)), is on the order of two or three beamwidths of the main lobe of the antenna 41B1, making it necessary to scan the active antenna in elevation (nod) in order to be sure that the main beam of the active seeker 41B illuminates the aircraft carrying the radar "R" at some time during the acquisition mode.

(U) It will be observed that the Doppler shift frequency impressed on each signal received by the active seeker 41B from each different reflecting element in the field of view is a function of range rate between each such reflector and the missile "M". During the acquisition mode, when the course of the missile "M" is changed continuously, the maximum change in range rate between each different reflecting element (as such element is illuminated) and the missile "M" is related to the width of the main lobe of the beam of the active seeker 41B.

(U) Specifically, the spread of Doppler shift frequencies for all stationary reflectors within the main beam is only $$\Delta f = f_{max}(1 - \cos W/2)$$

where $f_{max}$ is the maximum Doppler shift frequency and W is the width of the main lobe.

(U) The spread of Doppler shift frequencies when a conventional acquisition mode is carried out (meaning when the course of the missile "M" is kept steady and the antenna 41B1 (FIG. 4) is moved) may be approximated as $$\Delta f = f_{max}[\cos(X-W/2) - \cos(X+W/2)]$$

where X is the angle between the velocity vector of the missile "M" and the boresight line of the antenna 41B1.

(U) The Doppler spread of main lobe clutter when, as in conventional systems, the antenna is scanned to the side of the velocity vector is many times wider than that obtained in the contemplated system in which the antenna is always aligned with the velocity vector.

(U) The fact that the Doppler spectrum of each reflecting element in the field of view is here independent of the position of each such element in such field and is, further, as narrow as may be attained when the width of the main lobe is finite, is obviously of advantage when differences in Doppler shifts are important. Thus, in the case when a target to be tracked is on a course such that the Doppler shift of echo signal from such target are almost the same as the Doppler shifts of clutter signals, the narrowness of each of the Doppler spectra is highly desirable because the Doppler spectra of received signals are less apt to overlap, with the result that sources of the received signals may be more readily distinguished one from the other.

Referring again to FIG. 4, the elements making up the active seeker 41B are seen to be conventional in character. Thus the antenna 41B1 (which obviously is a monopulse antenna and includes some kind of transmit/receive switch (not shown) is fed by a transmitter 41B2 in its transmit mode and, in turn, feeds a monopulse arithmetic unit 41B3 in its received mode, The outputs (sum and difference) of the monopulse arithmetic unit 41B3 are fed to a radio frequency receiver 41B4, enabled in the receive mode by an exciter 41B5 to produce input signals for an I.F. amplifier 41B6 (enabled after the midcourse phase by a signal from the radar control unit 41C2). The signals out of the I.F. amplifier 41B6 are passed to a signal processor 41B7 (which may include the ARH signal processor 41A5 if filtering of "impossible" signals is desired) for final detection and conversion to digital form for application to the computer 41C1. That computer then, in response to the processed sum and difference signals, produces the requisite command signals to the navigation computer 41D1 and an antenna controller 41B8 to guide, in accordance with the well-known rules of proportional navigation, to intercept with the aircraft carrying the radar "R" (FIG. 1C). It will be noted in passing that the active seeker 41B would also include automatic tuning means (to allow echo signals from the desired target to be distinguished from clutter signals and to be tracked). Further, the active seeker would be operated in a known manner to eliminate range ambiguities. That is to say, the exciter 41B5 would be caused to produce a coded signal with a variable pulse repetition frequency. Still further, the missile "M" (FIG. 1C) would be equipped with a warhead and a conventional fuzing system (neither of which is shown) so that an actual collision between the missile "M" and the aircraft carrying the radar "R" (FIG. 1C) would not be required to assure destruction or neutralization of such aircraft.

(U) Having described a preferred embodiment of this invention, it will now be apparent to one of skill in the art that many changes may be made without departing from our inventive concepts. It is felt, therefore, that this invention should not be restricted to its disclosed embodiment, but rather should be limited only by the spirit and scope of the appended claims.

What is claimed is:

1. The method of determining the range, $R_0$, between a search radar transmitting interrogating pulses and a receiver adapted to determine the azimuthal angle of arrival of such pulses, such receiver being carried on an aircraft in flight approaching the field covered by such radar, such method comprising the steps of:

(a) dispensing reflecting elements from the aircraft to provide an auxiliary reflector for the interrogating pulses from the radar, the range between the aircraft and the auxiliary reflector, $R_1$, being known;

(b) determining the azimuthal angles of arrival of each one of the interrogating pulses and each corresponding pulse to determine the angle, $A_1$, between the ranges $R_0$ and $R_1$;

(c) determining the scan rate, azimuthal beamwidth and pulse repetition frequency of the search radar;

(d) measuring the difference in time between reception of the maxima of the interrogating pulses transmitted directly from the search radar to the receiver and the interrogating pulses reflected from the auxiliary reflector to the receiver;

(e) calculating, from the determined scan rate, azimuthal beamwidth and pulse repetition frequency and the measured difference in time, the angle $A_2$ defined by $R_0$ and the line from the search radar to the auxiliary reflector; and (f) calculating the range, $R_0$, using the values of $R_1$, $A_1$ and $A_2$ to solve, in accordance with the law of sines, the triangle formed by the radar, the auxiliary reflector and the receiver.

* * * * *